United States Patent
Pang et al.

(10) Patent No.: US 11,689,645 B2
(45) Date of Patent: *Jun. 27, 2023

(54) SERVICE DATA TRANSMISSION METHOD AND APPARATUS

(71) Applicant: Huawei Technologies Co., Ltd., Shenzhen (CN)

(72) Inventors: Lingli Pang, Shanghai (CN); Min Huang, Shenzhen (CN); Xiaoxiao Zheng, Shanghai (CN); Hao Bi, Rolling Meadows, IL (US)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 268 days.

This patent is subject to a terminal disclaimer.

(21) Appl. No.: 17/008,962

(22) Filed: Sep. 1, 2020

(65) Prior Publication Data

US 2020/0396319 A1  Dec. 17, 2020

Related U.S. Application Data

(63) Continuation of application No. 16/054,608, filed on Aug. 3, 2018, now Pat. No. 10,771,596, which is a (Continued)

(30) Foreign Application Priority Data

Feb. 4, 2016 (WO) ............... PCT/CN2016/073545

(51) Int. Cl.
*H04L 69/163* (2022.01)
*H04L 67/561* (2022.01)
(Continued)

(52) U.S. Cl.
CPC ............ *H04L 69/163* (2013.01); *H04L 47/00* (2013.01); *H04L 47/193* (2013.01); *H04L 67/56* (2022.05); *H04W 80/06* (2013.01); *H04W 28/10* (2013.01)

(58) Field of Classification Search
CPC ..... H04L 69/163; H04L 47/00; H04L 47/193; H04L 67/28; H04W 80/06; H04W 28/10
(Continued)

(56) References Cited

U.S. PATENT DOCUMENTS 8,462,748 B2   6/2013  Henry et al.
2002/0038362 A1*  3/2002  Bhatia ................. G06F 16/9537
                                                                709/224
(Continued)

FOREIGN PATENT DOCUMENTS

CN      1441368 A      9/2003
CN    101005367 A      7/2007
(Continued)

OTHER PUBLICATIONS

Office Action in Chinese Application No. 201680070314.6 dated Jan. 29, 2021, 6 pages.
(Continued)

*Primary Examiner* — Tauqir Hussain

(57) ABSTRACT

A service data transmission method and apparatus are provided. The method includes: obtaining, by an information control center, first information from a service server, where the first information includes service information and/or application information; obtaining, by the information control center, second information from user equipment, where the second information includes at least one of service information, mobility information, behavior information, and status information of the user equipment; and controlling, by the information control center, transmission of
(Continued)

service data of the user equipment based on the first information and/or the second information. In the embodiments of the present disclosure, transmission of the service data can be controlled based on specific information that is about the service data and that is obtained by the information control center, and different transmission quality is provided for different types of service data.

20 Claims, 2 Drawing Sheets

Related U.S. Application Data continuation of application No. PCT/CN2016/076971, filed on Mar. 22, 2016.

(51) Int. Cl.
*H04L 47/00* (2022.01)
*H04L 47/193* (2022.01)
*H04W 80/06* (2009.01)
*H04W 28/10* (2009.01)
*H04L 67/56* (2022.01)

(58) Field of Classification Search
USPC .......................................................... 709/230
See application file for complete search history.

(56) References Cited

U.S. PATENT DOCUMENTS

| | | | | |
|---|---|---|---|---|
| 2005/0235007 | A1* | 10/2005 | Abali | G06F 11/0748 |
| 2006/0242228 | A1* | 10/2006 | Eggers | H04L 9/40 |
| | | | | 709/203 |
| 2006/0242629 | A1* | 10/2006 | Ansari | H04L 69/08 |
| | | | | 717/136 |
| 2009/0059840 | A1* | 3/2009 | Moon | H04W 76/11 |
| | | | | 370/328 |
| 2009/0228905 | A1* | 9/2009 | Aghajanyan | G06F 9/544 |
| | | | | 719/328 |
| 2009/0265413 | A1* | 10/2009 | Katsuragi | H04L 67/02 |
| | | | | 709/201 |
| 2011/0145323 | A1 | 6/2011 | Kahn et al. | |
| 2011/0149909 | A1* | 6/2011 | An | H04W 8/06 |
| | | | | 370/328 |
| 2012/0064908 | A1 | 3/2012 | Fox et al. | |
| 2012/0078683 | A1* | 3/2012 | Mendiratta | G06Q 30/0201 |
| | | | | 705/7.29 |
| 2013/0191901 | A1* | 7/2013 | Black | H04L 63/0876 |
| | | | | 726/7 |
| 2013/0235795 | A1* | 9/2013 | Huang | H04W 28/18 |
| | | | | 370/328 |
| 2017/0347390 | A1* | 11/2017 | Cho | H04W 80/10 |

FOREIGN PATENT DOCUMENTS

| | | |
|---|---|---|
| CN | 101060690 A | 10/2007 |
| CN | 101404610 A | 4/2009 |
| CN | 101577937 A | 11/2009 |
| CN | 101656716 A | 2/2010 |
| CN | 101917742 A | 12/2010 |
| CN | 102055761 A | 5/2011 |
| CN | 102111381 A | 6/2011 |
| CN | 102158810 A | 8/2011 |
| CN | 102711162 A | 10/2012 |
| CN | 103346972 A | 10/2013 |
| CN | 103428028 A | 12/2013 |
| EP | 1319295 B1 | 2/2011 |
| EP | 2487809 B1 | 3/2014 |
| ES | 2430362 T3 | 11/2013 |

OTHER PUBLICATIONS

Chinese Search Report in Application No. 2016800703146 dated Jan. 5, 2021.
Huang Jin et al., Business Backup Technology Research on Service Access and Control Layer of IP Metropolitan Area Network,Proceedings of the 2013 Annual Meeting of the Information and Communication Network Technology Committee of China Communication Society, 2013, 2 pages.
Notice of Allowance for Chinese Application No. 201680070314.6, dated Nov. 16, 2021, 4 pages.

\* cited by examiner

SERVICE DATA TRANSMISSION METHOD AND APPARATUS

CROSS-REFERENCE TO RELATED APPLICATIONS

This application is a continuation of U.S. patent application Ser. No. 16/054,608, filed on Aug. 3, 2018, which is a continuation of International Application No. PCT/CN2016/076971, filed on Mar. 22, 2016, which claims priority to International Application No. PCT/CN2016/073545, filed on Feb. 4, 2016. All of the aforementioned patent applications are hereby incorporated by reference in their entireties.

TECHNICAL FIELD

Embodiments of the present disclosure relate to the communications field, and in particular, to a service data transmission method and apparatus.

BACKGROUND

Currently, a network side device, especially an access network device, may set a transmission bearer based on only limited service information, and transmit service data. In a long term evolution (LTE) system, service data of specific services such as WeChat and Youku is mapped to a corresponding evolved packet core (EPC) bearer by using a traffic flow template (TFT), and is finally transmitted to a packet data network gateway (P-GW), thereby completing data exchange between user equipment (UE) and a service server.

Service quality that can be provided by a service data transmission channel provided by the network side device is determined when the service data transmission channel is initially established. However, one service has different requirements for service quality in different time periods or different data packets in one service have different requirements for service quality. In an existing service quality ensuring mechanism, a transmission parameter of a bearer cannot be flexibly adjusted based on a service data requirement. A main reason is that the network side device such as an evolved NodeB (eNB), a serving gateway (S-GW), or a P-GW does not know specific information about a requirement of service data transmitted on the bearer for the transmission parameter. Therefore, it is difficult for the network side device to accurately provide the service data with proper service quality.

SUMMARY

An objective of this application is to provide an improved service data transmission solution, to improve transmission quality of service data between user equipment and a service server.

According to a first aspect, this application provides a service data transmission method, including: obtaining, by an information control center, first information from a service server, where the first information includes at least one of service information or application information; obtaining, by the information control center, second information from user equipment, where the second information includes at least one of service information, mobility information, behavior information, or status information of the user equipment; and controlling, by the information control center, transmission of service data of the user equipment based on at least one of the first information or the second information.

In this embodiment of the present disclosure, transmission of the service data can be controlled based on specific information that is about the service data and that is obtained by the information control center, and different transmission quality is provided for different types of service data. Compared with a fact that a network side device transmits only service data in the prior art, transmission of the service data can be more flexibly adjusted, and transmission quality of the service data can be improved.

With reference to the first aspect, in a possible implementation of the first aspect, at least part of the first information is obtained by the service server from the user equipment.

With reference to the first aspect or the foregoing implementation, in a possible implementation of the first aspect, the service information includes at least one of service flow information, a service volume, a service scheduling level indication, or service status information of a service flow in which the service data is located, and the service flow information includes at least one of the following information: a service flow identifier, a service flow class, a mobility requirement of the service flow, a service volume, a service scheduling level indication, a delay requirement of the service flow, service status information, transport layer information of the service flow, routing information of the service flow, or server information of the service flow.

With reference to any one of the first aspect or the foregoing implementations, in a possible implementation of the first aspect, the mobility information includes at least one of the following information of the user equipment: a moving rate, a moving direction, current location information, predicted location information, signal quality information, or a handover preparation indication.

With reference to any one of the first aspect or the foregoing implementations, in a possible implementation of the first aspect, the behavior information includes information that is entered by a user into the user equipment, and the entered information is used to control a working status of software in the user equipment.

With reference to any one of the first aspect or the foregoing implementations, in a possible implementation of the first aspect, the status information includes at least one of the following information of the user equipment: a quantity of electricity, a screen resolution, a screen size, sensor information, a type of an operating system, or central processing unit usage.

With reference to any one of the first aspect or the foregoing implementations, in a possible implementation of the first aspect, the controlling, by the information control center, transmission of service data based on at least one of the first information or the second information includes: performing, by the information control center, at least one of the following operations based on at least one of the first information or the second information: establishing a plurality of bearers or a plurality of flows for the service data; determining a scheduling priority of the service data; determining a transmission delay of the service data; determining a bit rate of the service data; establishing a transport layer proxy for the service data on a network side; selecting a service server for a service; determining a decoding manner of the service data; determining whether the service data can be transmitted by occupying a resource on the network side; determining a type of a resource used for data transmission of the service data; or performing a local exchange for the service.

With reference to any one of the first aspect or the foregoing implementations, in a possible implementation of the first aspect, the controlling, by the information control center, transmission of service data of the user equipment based on at least one of the first information or the second information includes: sending, by the information control center, third information to the service server or the user equipment, where the third information is used to control transmission of the service data of the user equipment, and the third information includes at least one of the following information: load information of a cell, cell edge indication information, handover indication information, transport layer proxy information of the cell, information about available bandwidth of the user equipment, or bit rate switching indication information.

According to a second aspect, this application provides a service data transmission apparatus, including: a first obtaining module, configured to obtain first information from a service server, where the first information includes at least one of service information or application information; a second obtaining module, configured to obtain second information from user equipment, where the second information includes at least one of service information, mobility information, behavior information, or status information of the user equipment; and a control module, configured to control transmission of service data of the user equipment based on at least one of the first information obtained by the first obtaining module or the second information obtained by the second obtaining module.

In this embodiment of the present disclosure, transmission of the service data can be controlled based on specific information that is about the service data and that is obtained by an information control center, and different transmission quality is provided for different types of service data. Compared with a fact that a network side device transmits only service data in the prior art, transmission of the service data can be more flexibly adjusted, and transmission quality of the service data can be improved.

With reference to the second aspect, in a possible implementation of the second aspect, at least part of the first information is obtained by the service server from the user equipment.

With reference to the second aspect or the foregoing implementation, in a possible implementation of the second aspect, the service information includes at least one of service flow information, a service volume, a service scheduling level indication, or service status information of a service flow in which the service data is located, and the service flow information includes at least one of the following information: a service flow identifier, a service flow class, a mobility requirement of the service flow, a service volume, a service scheduling level indication, a delay requirement of the service flow, service status information, transport layer information of the service flow, routing information of the service flow, or server information of the service flow.

With reference to any one of the second aspect or the foregoing implementations, in a possible implementation of the second aspect, the mobility information includes at least one of the following information of the user equipment: a moving rate, a moving direction, current location information, signal quality information, predicted location information, or a handover preparation indication.

With reference to any one of the second aspect or the foregoing implementations, in a possible implementation of the second aspect, the behavior information includes information that is entered by a user into the user equipment, and the entered information is used to control a working status of software, an operating system, or a bottom-layer module in the user equipment.

With reference to any one of the second aspect or the foregoing implementations, in a possible implementation of the second aspect, the status information includes at least one of the following information of the user equipment: a quantity of electricity, a screen resolution, a screen size, sensor information, a type of an operating system, or central processing unit usage.

With reference to any one of the second aspect or the foregoing implementations, in a possible implementation of the second aspect, the control module is specifically configured to perform at least one of the following operations based on at least one of the first information or the second information: establishing a plurality of bearers or a plurality of flows for the service data; determining a scheduling priority of the service data; determining a transmission delay of the service data; determining a bit rate of the service data; establishing a transport layer proxy for the service data on a network side; selecting a service server for a service corresponding to the service data; determining a decoding manner of the service data; determining whether the service data can be transmitted by occupying a resource on the network side; determining a type of a resource used for data transmission of the service data; or performing a local exchange for the service corresponding to the service data.

With reference to any one of the second aspect or the foregoing implementations, in a possible implementation of the second aspect, the control module is specifically configured to send third information to the service server or the user equipment, where the third information is used to control transmission of the service data of the user equipment, and the third information includes at least one of the following information: load information of a cell, cell edge indication information, handover indication information, transport layer proxy information of the cell, information about available bandwidth of the user equipment, or bit rate switching indication information.

According to a third aspect, this application provides a processor, where the processor is configured to execute an instruction, and when the instruction is executed, the processor performs the method in the first aspect.

According to a fourth aspect, this application provides a computer readable storage medium, where the computer readable storage medium is configured to store program code of a service data transmission method, and the program code includes an instruction used to perform the method in the first aspect.

In some implementations, an information control center controls transmission of service data of the user equipment based on at least one of first information or second information. Alternatively, the information control center controls transmission of service data between the user equipment and a service server based on at least one of the first information or the second information.

In some implementations, the controlling transmission of service data of user equipment may include controlling transmission of the service data on a bearer. The bearer may be a bearer established between a network side device and the user equipment, and the bearer is used to transmit service data of a service between the user equipment and the service server.

In some implementations, a service identifier and a service class may be a service identifier of the service corresponding to the service data and a service class of the service corresponding to the service data.

In some implementations, at least part of the first information may be at least one of service information, mobility information, behavior information, or status information of the user equipment.

In some implementations, the information control center may be a logical functional entity, and may be located on one network side device, or may be located on a plurality of network side devices.

This application provides the service data transmission method, and transmission quality of the service data between the user equipment and the service server can be improved by implementing the solutions.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
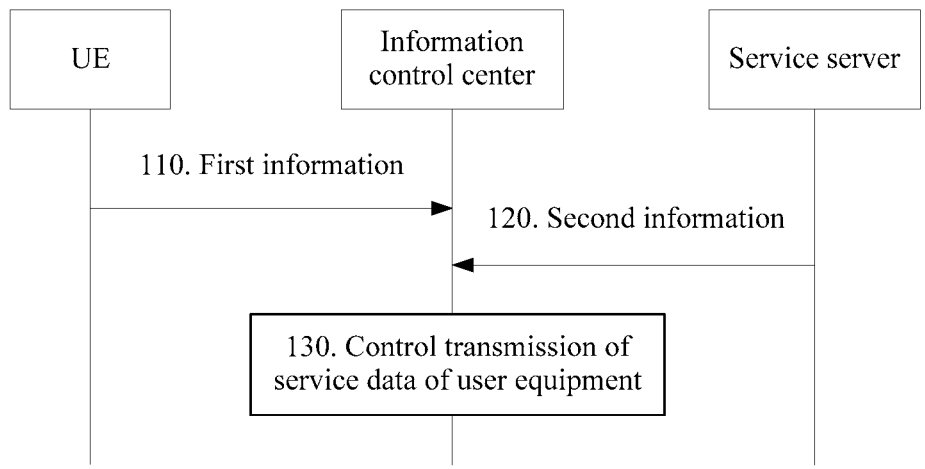
FIG. 1 is a schematic flowchart of a service data transmission method according to an embodiment of the present disclosure.

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

It should be understood that the technical solutions of the present disclosure may be applied to various communications systems, such as a global system for mobile communications (GSM) system, a code division multiple access (CDMA) system, wideband code division multiple access (WCDMA) system, a general packet radio service (GPRS) system, LTE system, and a continuous evolved communications system of the foregoing systems.

It should be further understood that user equipment (UE), also referred to as a mobile terminal, mobile user equipment, or the like, is a device that occupies a resource on a network side to send or obtain data, for example, may communicate with one or more core networks through a radio access network (RAN). The user equipment may be a mobile terminal such as a mobile phone (or referred to as a "cellular" phone), and a computer that has a mobile terminal, for example, may be a portable, pocket-sized, handheld, computer built-in or in-vehicle mobile apparatus. The mobile terminal and the computer exchange languages and/or data with the radio access network.

It should be further understood that an information control center is a set of functions or modules completing the present disclosure, and information collection, information analysis, information exchange, information control, and the like in the present disclosure can be completed by using the functions or the modules of the information control center. As a logical functional entity, the information control center may be located on any type of network side device, or may be located on a plurality of network side devices. A network side device has all of or some of the functions of the information control center. Alternatively, the information control center may be a network side device, and may exchange information with at least one other network side device. For example, the information control center may be an access network device or a part of the access network device in a mobile communications system, for example, may be a base station and/or a radio network controller (RNC) in a mobile communications system (UMTS), or may be an evolved NodeB (eNodeB) or some functions of the eNodeB in an LTE system. Alternatively, the information control center may be a core network device in the mobile communications system, for example, a serving general packet radio service support node (SGSN) and/or a gateway general packet radio service support node (GGSN) in the UMTS. Alternatively, the information control center may be a mobility management entity (MME), an S-GW, a P-GW, a policy and charging rules function (PCRF), or the like in the LTE system. The information control center may be further an access network device or a core network device in another mobile communications system. A control module of the information control center may be in a core network device, and an information collection module may be in an access network device. In an evolution process of a communications system, the information control center may also be an entity controlling data transmission in a centralized manner, a part of the control entity, or a user plane entity.

It should be further understood that a network side device in the following embodiments may be any relay device in a service data transmission process, and the relay device may be UE. This is not specifically limited in the embodiments of the present disclosure.

It should be further understood that a service server may be a device providing service data to UE or a control device on a network side. For example, the service server may be a server (for example, an over the top (OTT) server) providing a service to a user through the Internet, a third-party server, a local server, a server of an operator, or a management control device on the network side. This is not specifically limited in the embodiments of the present disclosure.

FIG. 1 shows a schematic flowchart of a service data transmission method according to an embodiment of the present disclosure. The method shown in FIG. 1 includes the following steps.

110. An information control center obtains first information sent by a service server.

For example, the first information may include at least one of service information or application information. The application information may include at least one of the following information: an application identifier of an application provided by the service server, version information of the application, a service flow list of the application, a service flow identifier of the application, or a setting parameter related to the application, and the like. The service flow list may further include all of or some of socket information corresponding to a service flow. For example, for the Sohu Video, the application information may include application information shown in Table 1.

TABLE 1

Application information of the Sohu Video

| | |
|---|---|
| Identifier of an application | APP-ID = 3 |
| Version information of the application | Version 3.1.0 |
| Name of the application | Sohu Video |
| Service flow list of the application | Web (1), video (2), and advertisement (3) |
| Cache setting of the application | 10 s |
| Cache threshold of the application | 3 s |

It should be noted that the application information may be user equipment-level information, or may be application server-level information. The application information may be sent to the information control center when the service server needs to transmit service data by using a network side device. For a subsequent sending manner, the application information may be sent only when the service data changes or the application information may be periodically sent based on a pre-stored period. Alternatively, the application information may be reported when an application in user equipment is enabled. Because different parameters are reported when different user equipment enable a same application, the sending manner of the application information is not specifically limited in the present disclosure.

120. The information control center obtains second information sent by user equipment.

For example, the second information may include at least one of service information, mobility information, behavior information, or status information of the user equipment.

It should be understood that, for a service between the service server and the user equipment, the service information in the first information is obtained from the service server, the service information in the second information is obtained from the user equipment, the service information in the first information may include same content as the service information in the second information, and the service information in the first information may be different from the service information in the second information.

Optionally, in an embodiment, the service information in the first information may be semi-static service information, for example, a service identifier or a service class. The service information in the second information is dynamic service information, for example, a delay requirement of service data or a cache size of an application transmitting the service data.

Optionally, in an embodiment, the service information includes at least one of service flow information, a service volume, a service scheduling level indication, or service status information of a service flow in which the service data is located. The service flow information includes at least one of the following information: a service flow identifier, a service flow class, a mobility requirement of the service flow, a delay requirement of the service flow, transport layer information of the service flow, routing information of the service flow, or server information of the service flow.

It should be understood that the service flow, the service, and a service data packet may be replaced with each other in this embodiment of the present disclosure. One service may include at least one service flow, and one service flow may transmit at least one service data packet. Different service flows of a same service or application may have different transmission requirements, and different service data packets in one service flow may also have different transmission requirements.

For example, the transport layer information of the service flow may include at least one of the following information: a transport layer protocol mode, a transport layer identifier, a transport layer proxy indication, auxiliary decoding information, or transport layer setting information, or the like.

The transport layer protocol mode may be a protocol used by a transport layer, for example, the transmission control protocol (TCP) or the user datagram protocol (UDP).

The transport layer identifier may be information that uniquely identifies the transport layer, for example, at least one parameter in an internet protocol (IP) 5-tuple.

The transport layer proxy indication allows or enables an intermediate proxy for the transport layer of a link, for example, a proxy function of the TCP is executed on a network side, and the proxy function includes at least one of constructing a TCP acknowledgement packet or caching data of the TCP.

The auxiliary decoding information may be prior information of a service data packet, and may be used to perform bottom-layer decoding in an auxiliary manner. For example, the auxiliary decoding information is a size of the service data packet or an encapsulation format of service data.

The transport layer setting information may be a parameter of the transport layer, for example, a transmission serial number, a receive window size or a transmit window size, a transmission round-trip time, or a maximum transport block size.

The service volume may be a volume of data that is to be transmitted by the UE or the service server within a time period. The service volume may be further a volume of data that is already sent by the UE or the service server and/or a volume of data that is to be received by the UE or the service server within a time period. Further, the service volume includes time information and information about a direction (a service is sent from a server to a terminal device or is sent from a terminal device to a server) corresponding to the service volume. It should be noted that the data volume may be a time of presenting data to a user or a quantity of bits of the data. For example, for a video service, a service volume is data that is sent by the server to the UE and that may be played in unit times. The unit time herein depends on a setting parameter of a player.

The service scheduling level indication may be indication information that is sent by the UE to the information control center and that is used to request to perform scheduling quickly or to slow down scheduling. The indication information may be included in a header of a service data packet, for example, a packet data convergence protocol (PDCP) header or a media access control (MAC) header.

The delay requirement of the service flow may be specifically a throughput of the transport layer, a throughput of an air interface, bit rate information of the data packet, or the like within a time period. Further, the delay requirement of the service flow may be further a cache situation of an application associated with the service flow, and the cache situation includes a volume of data in a cache at a current moment or duration within which the data can be played.

The service flow identifier is used to uniquely identify one service flow. For example, the service flow identifier may be at least one of a name of the service flow, provider information of a service, an identifier of an application providing the service, an identifier of a server providing the service, or identifier information of a bearer transmitting the service flow.

Information about the service flow class is used to indicate a class to which the service flow belongs, for example, indicate that the service is a background service or a flow service. Alternatively, the information about the service flow class may further indicate that the service is an interactive game service, a web browsing service, a video on-live service, a video on demand service, or the like.

The service status information is used to indicate a current status of the service, for example, indicate that the service runs in a background, in a foreground, or the like. For a video service or a flow service, the service status information may further indicate that the service is currently in a playback state, in an initial buffer state, in a paused state, or in a frame freezing state.

The mobility requirement of the service flow is used to indicate a mobility requirement of the service corresponding to the service data. For example, the mobility requirement of the service may be classified into high, intermediate, and low mobility requirements. When the service has a relatively high requirement for mobility, the mobility requirement of the service may improve continuity of the service.

The server information of the service flow is information about a server providing data for the user equipment. For example, the information is an identifier of the server or an address of the server.

The routing information of the service flow is used to indicate a routing manner, such as a local exchange or local routing, that may be supported by the service flow or that is selected by the user equipment.

Optionally, in an embodiment, the mobility information includes at least one of the following information of the user equipment: a moving rate, a moving direction, current location information, signal quality information, predicted location information, or a handover preparation indication.

For example, the predicted location information is information about a location that is of a mobile terminal after a time period and that is predicted by the mobile terminal. The handover preparation indication is used by a terminal device to indicate, to the information control center, that handover needs to be performed after a time period. The handover preparation indication may further include a handover time.

It should be understood that the mobility information may be obtained by using a sensor of the UE. The sensor may be a gyroscope, an acceleration sensor, a barometer, or the like in an operating system. Alternatively, the mobility information may be obtained from an application running in the UE. This is not specifically limited in the present disclosure.

Optionally, in an embodiment, the behavior information includes information entered by a user into the user equipment. The entered information is used to control a working status of software, an operating system, or a bottom-layer module (modem) in the user equipment.

For example, the behavior information may be used to instruct the user to perform a related operation on the service by using the user equipment. For example, the behavior information is used to instruct the user to perform user behavior operations such as whether to stop running of the service, whether to switch the service to the background, whether to drag the service, whether to power off the user equipment, and whether to lock a screen of the user equipment.

Optionally, in an embodiment, the status information includes at least one of the following information of the user equipment: a quantity of electricity, a screen resolution, a screen size, sensor information, a type of an operating system, or central processing unit (CPU) usage.

For example, the sensor information may include information such as a type of the sensor of the user equipment and precision of the sensor. The type of the operating system may be an operating system supported by the user equipment, and version information of the operating system supported by the user equipment.

It should be understood that the second information may be different for different services. For example, when the service corresponding to the service data is a video service, the second information may be a request indication sent the first time; information about a response for request information sent by the user equipment, for example, a size of a response packet or an identifier of the response packet; cache information of a player, for example, a cache size of the video, a time within which data stored in a cache can be played when a request is sent, or a sending delay of a data packet of the information about the response corresponding to the sent request; information about a server accessed by the user equipment; a bit rate of the video service, or the like.

It should be further understood that there is no time sequence between step 110 and step 120. The information control center may first perform step 110 and then perform step 120. Alternatively, the information control center may first perform step 120 and then perform step 110. This is not limited herein.

It should be further understood that in an information obtaining process of the information control center, information in step 110 and step 120 are not necessarily reported. For example, whether to report the information in step 110 and step 120 and how to report the information in step 110 and step 120 depend on reporting policies of the service server and the user equipment. The information control center may receive only information reported by the user equipment or the server, and control transmission based on the information.

It should be noted that the application information may also be reported by the user equipment to the information control center.

130. The information control center controls transmission of service data of the user equipment based on at least one of the first information or the second information.

Optionally, in an embodiment, that the information control center controls transmission of service data based on at least one of the first information or the second information includes: The information control center performs at least one of the following operations based on at least one of the first information or the second information: establishing a plurality of bearers or a plurality of flows for the service data; determining a scheduling priority of the service data; determining a transmission delay of the service data; determining a bit rate of the service data; establishing a transport layer proxy for the service data on a network side; selecting a service server for a service corresponding to the service data; determining a decoding manner of the service data; determining whether the service data can be transmitted by occupying a resource on the network side; determining a type of a resource used for data transmission of the service data; or performing a local exchange for the service corresponding to the service data.

For example, the establishing a plurality of bearers or a plurality of flows for the service data may be establishing a plurality of bearers for different service flows of the service, or establishing a plurality of bearers for one service flow of the service.

The determining a scheduling priority of the service data may be determining a scheduling priority of the service in a transmission process, and indicating the scheduling priority to each network node. Priority information may be added to a header of a service data packet.

The determining a transmission delay of the service data may be determining, based on a service identifier of the service data, a time required for transmission.

The determining a bit rate of the service data may be determining, according to a rule of the information control center, a bit rate that may be used by the service flow. The bit rate may be an encoding bit rate or may be a playback bit rate.

The selecting a service server for a service includes selecting a proper server for the service flow based on at least one of the first information or the second information, for example, selecting a server based on a data transmission path or selecting a server according to a charging rule.

The performing a local exchange for the service may be performing a local exchange for an identified service flow based on a service class, locations of two communication parties, and the like, and some network side devices are bypassed.

The determining a type of a resource used for data transmission of the service data may be determining at least one of an air interface technology or a transmission time interval type used for data transmission based on information such as the service flow identifier or the service flow class of the service flow in which the service data is located.

Optionally, in an embodiment, that the information control center controls transmission of service data of the user equipment based on at least one of the first information or the second information includes: The information control center sends third information to the service server or the user equipment, where the third information is used to control transmission of the service data, and the third information includes at least one of the following information: load information of a cell, cell edge indication information, handover indication information, transport layer proxy information of the cell, information about available bandwidth of the user equipment, or bit rate switching indication information.

The third information may also include information obtained through calculation based on the foregoing information. This is not specifically limited herein. Further, the third information may be sent to an application or the operating system of the user equipment, and application software or the operating system determines, based on the third information, to control data transmission. Optionally, the handover indication information is used to indicate that a cell of the user equipment is to change or receiving quality of the user equipment is to change, for example, the receiving quality becomes poor or the receiving quality becomes better.

For example, the load information of the cell may be further load information of the cell for a type of an application, a type of a service flow, or a type of a terminal. For example, the load information is load level information.

The information about available bandwidth of the user equipment may be information about bandwidth or a resource that is available in a time period and that is estimated by the network side device for the user equipment; or information about available bandwidth or an available resource reserved or pre-scheduled by the network side device for the user equipment.

The bit rate switching indication information is used to indicate that a bit rate of the user equipment changes. For example, the bit rate switching indication information may be an indication indicating that the bit rate increases or the bit rate decreases, or a bit rate value recommended by the information control center.

The transport layer proxy information of the cell is used to indicate a transport layer proxy established by the network side device for the service flow, and further includes parameter information obtained after the proxy is established. For example, after establishing a TCP proxy for the service, the information control center may send information about the TCP proxy to the user equipment, and the user equipment controls transmission of the service based on the information about the TCP proxy.

In this embodiment of the present disclosure, when the first information, the second information, and the third information are transmitted between the information control center, the user equipment, and the service server, the specific information may be transmitted by using the hypertext transfer protocol (HTTP) or the file transfer protocol (FTP), and the specific information may be encapsulated in an extensible markup language (XML) format. The specific information may also be included in a header of a service data packet, for example, a header of the TCP or the IP.

Further, in a data transmission process of the user equipment and the information control center, the information may be transmitted by using radio resource control (RRC) signaling, or may be transmitted by using network attached storage (NAS) signaling.

In this embodiment of the present disclosure, the information control center may also indirectly control data transmission. For example, the information control center transmits control information to another control entity, and the another control entity controls transmission, and sends the control information to the user equipment. Alternatively, the information control center sends at least one of the received first or second information to another control entity, and the another control entity controls data transmission.

Figure 2:
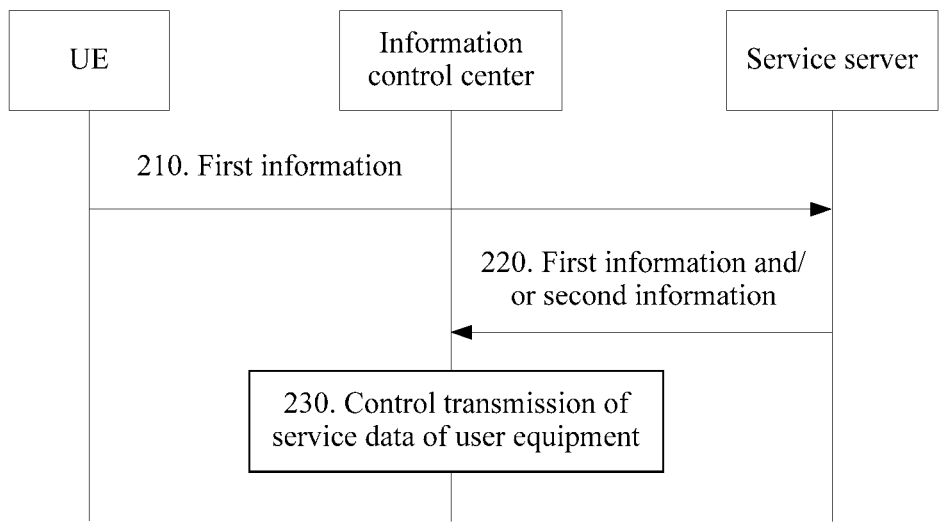
FIG. 2 is a schematic flowchart of a service data transmission method according to another embodiment of the present disclosure.

FIG. 2 shows a schematic flowchart of a service data transmission method according to another embodiment of the present disclosure. It should be understood that content of first information in the method shown in FIG. 2 is the same as content of the first information in the method shown in FIG. 1, and content of second information in the method shown in FIG. 2 is the same as content of the second information in the method shown in FIG. 1. For brevity, details are not described herein again. The method shown in FIG. 2 includes the following steps.

210. User equipment sends the first information to a service server.

220. The service server sends the second information to an information control center.

For example, the second information includes some of or all of the content of the first information.

230. The information control center controls transmission of service data of the user equipment based on at least one of the first information or the second information.

Optionally, that the information control center controls transmission of service data of the user equipment based on at least one of the first information or the second information further includes: The information control center sends third information to the service server or the user equipment, where the third information is used to control transmission of the service data. The third information herein is the same as the third information in the method shown in FIG. 1. Details are not described herein again. It should be understood that a control method for controlling transmission of the service data of the user equipment in step 230 is the same as a control method for controlling transmission of the service data of the user equipment in step 130 in the method shown in FIG. 1. For brevity, details are not described herein again.

Figure 3:
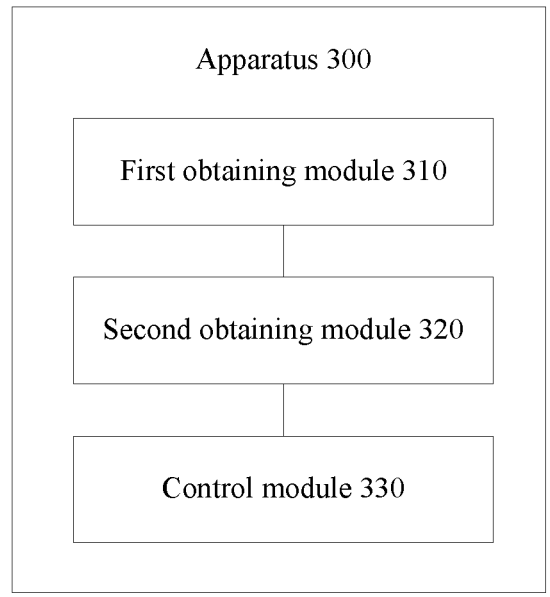
FIG. 3 is a schematic block diagram of a service data transmission apparatus according to an embodiment of the present disclosure.

FIG. 3 shows a schematic block diagram of a service data transmission apparatus according to an embodiment of the present disclosure. The apparatus 300 shown in FIG. 3 includes a first obtaining module 310, a second obtaining module 320, and a control module 330.

The first obtaining module 310 is configured to obtain first information sent by a service server. The first information includes at least one of service information or application information.

The second obtaining module 320 is configured to obtain second information sent by user equipment. The second information includes at least one of service information, mobility information, behavior information, or status information of the user equipment.

The control module 330 is configured to control transmission of service data of the user equipment based on at least one of the first information obtained by the first obtaining module or the second information obtained by the second obtaining module.

In this embodiment of the present disclosure, transmission of the service data can be controlled based on specific information that is about the service data and that is obtained by an information control center, and different transmission quality is provided for different types of service data. Compared with a fact that a network side device transmits only service data in the prior art, transmission of the service data can be more flexibly adjusted, and transmission quality of the service data can be improved.

It should be understood that the apparatus shown in FIG. 3 may be the information control center, or may be a combination of the information control center and some network side devices. The information control center may include a data collection unit, a data analysis unit, and a controller. The data collection unit is configured to receive at least one of the first information or the second information. The data analysis unit is configured to analyze at least one of the first information or the second information, to determine control performed on the service data. The controller is configured to control a reporting manner and at least one of the first information or the second information.

Figure 4:
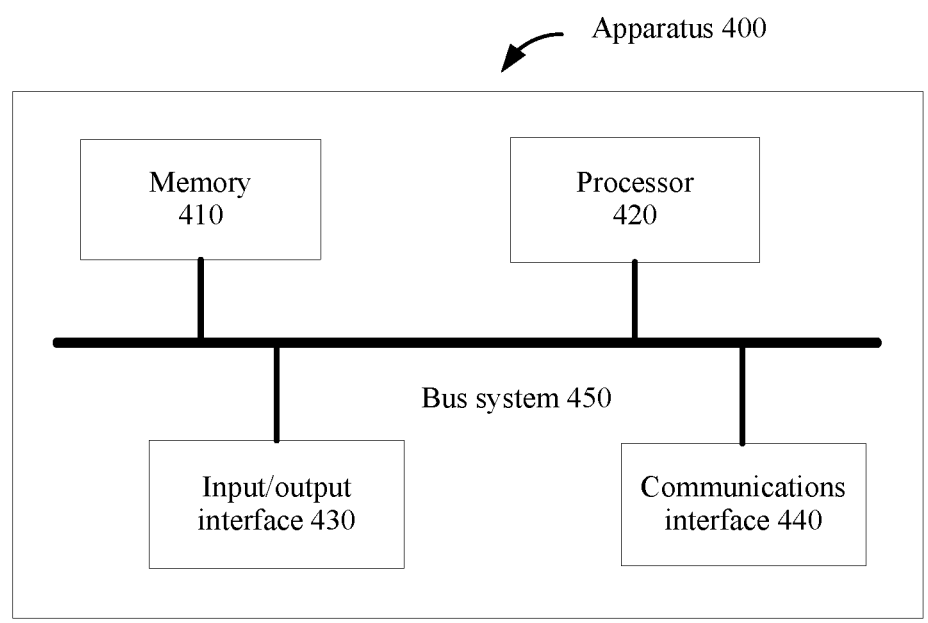
FIG. 4 is a schematic block diagram of a service data transmission apparatus according to another embodiment of the present disclosure.

FIG. 4 is a schematic block diagram of a service data transmission apparatus according to another embodiment of the present disclosure.

The apparatus 400 shown in FIG. 4 includes a memory 410, a processor 420, an input/output interface 430, a communications interface 440, and a bus system 450. The memory 410, the processor 420, the input/output interface 430, and the communications interface 440 are connected by using the bus system 450. The memory 410 is configured to store an instruction. The processor 420 is configured to execute the instruction stored by the memory 410, to control the input/output interface 430 to receive entered data and information, output data such as an operation result, and control the communications interface 440 to send a signal.

The communications interface 440 is configured to: obtain first information sent by a service server, where the first information includes at least one of service information or application information; and obtain second information sent by user equipment, where the second information includes at least one of service information, mobility information, behavior information, or status information of the user equipment.

The processor 420 is configured to control transmission of service data of the user equipment based on at least one of the first information or the second information.

It should be understood that in this embodiment of the present disclosure, the processor 420 may be a general purpose central processing unit (CPU), a microprocessor, an application-specific integrated circuit (ASIC), or one or more integrated circuits, and is configured to execute a related program, so as to implement the technical solutions provided in the embodiments of the present disclosure.

It should be further understood that the communications interface 440 uses a transceiver apparatus such as but not limited to a transceiver to implement communication between the apparatus 400 and another device or communications network.

The memory 410 may include a read-only memory and a random access memory, and provide an instruction and data for the processor 420. A part of the memory 420 may further include a non-volatile random access memory. For example, the processor 420 may further store information about a device type.

In addition to a data bus, the bus system 450 may further include a power bus, a control bus, a status signal bus, and the like. However, for clear description, various buses in the figure are marked as the bus system 450.

In an implementation process, steps in the foregoing methods may be completed by using an integrated logic circuit of hardware in the processor 420 or an instruction in a form of software. The steps of the service data transmission methods disclosed with reference to the embodiments of the present disclosure may be directly performed and completed by a hardware processor, or performed and completed by a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 410, and the processor 420 reads information in the memory 410, and completes the steps of the foregoing method in combination with hardware of the processor 420. To avoid repetition, details are not described herein.

In this embodiment of the present disclosure, transmission of service data on a bearer can be controlled based on specific information that is about the service data and that is obtained by an information control center, and different transmission quality is provided for different types of service data. Compared with a fact that an information control center transmits only service data in the prior art, transmission quality of the service data on the bearer is improved.

It should be understood that in the embodiments of the present disclosure, "B corresponding to A" indicates that B is associated with A, and B may be determined based on A. However, it should further be understood that determining B based on A does not mean that B is determined based on A only, in other words, B may be determined based on A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers in the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The descriptions are only specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A service data transmission method performed by an information control center, the method comprising:
   obtaining first information from user equipment, wherein the first information comprises a type of an operating system;
   obtaining second information from a service server, wherein
      the second information comprises application information including an application identifier of an application from the service server; and
   controlling transmission of service data of the user equipment based on the first information obtained from the user equipment and the second information obtained from the service server.

2. The method according to claim 1, wherein
   the second information comprises a service volume from the service server, and
   controlling transmission of the service data comprises:
      controlling transmission of the service data of the user equipment based on the first information and the service volume.

3. The method according to claim 1, wherein
   the second information comprises routing information of a service flow from the service server, and
   controlling transmission of the service data comprises:
      controlling transmission of the service data of the user equipment based on the first information and the routing information of the service flow.

4. The method according to claim 1, wherein the first information further comprises information of the user equipment including: a quantity of electricity, a screen resolution, a screen size, sensor information, or central processing unit usage.

5. The method according to claim 1, wherein controlling the transmission of the service data comprises: determining whether the service data can be transmitted by occupying a resource on the network side based on the first information.

6. The method according to claim 1, wherein controlling the transmission of the service data comprises:
   performing, based on the first information, at least one of:
      (a) establishing a plurality of bearers or a plurality of flows for the service data;
      (b) determining a scheduling priority of the service data;
      (c) determining a transmission delay of the service data;
      (d) determining a bit rate of the service data;
      (e) establishing a transport layer proxy for the service data on a network side;
      (f) selecting a service server for a service corresponding to the service data;
      (g) determining a decoding manner of the service data;
      (h) determining a type of a resource used for data transmission of the service data; and
      (i) performing a local exchange for the service corresponding to the service data.

7. The method according to claim 1, wherein controlling the transmission of the service data of the user equipment based on the first information and the second information comprises:

determining whether the service data can be transmitted by occupying a resource on the network side based on the first information and the second information.

8. The method according to claim 1, wherein controlling the transmission of the service data of the user equipment based on the first information and the second information comprises:
performing, based on the first information and the second information, at least one of:
(a) establishing a plurality of bearers or a plurality of flows for the service data;
(b) determining a scheduling priority of the service data;
(c) determining a transmission delay of the service data;
(d) determining a bit rate of the service data;
(e) establishing a transport layer proxy for the service data on a network side;
(f) selecting a service server for a service corresponding to the service data;
(g) determining a decoding manner of the service data;
(h) determining a type of a resource used for data transmission of the service data; and
(i) performing a local exchange for the service corresponding to the service data.

9. A service data transmission apparatus, comprising:
a receiver configured to:
receive first information from user equipment, wherein the first information comprises a type of an operating system, and
receive second information from a service server, wherein
the second information comprises application information including an application identifier of an application from the service server; and
a processor, operatively coupled to the receiver, and configured to:
control transmission of service data of the user equipment based on the first information obtained from the user equipment and the second information obtained from the service server.

10. The apparatus according to claim 9, wherein
the second information comprises a service volume from the service server;
the processor is further configured to:
control transmission of the service data of the user equipment based on the first information and the service volume.

11. The apparatus according to claim 9, wherein
the second information comprises routing information of a service flow from the service server, and
the processor is further configured to:
control transmission of the service data of the user equipment based on the first information and the routing information of the service flow.

12. The apparatus according to claim 9, wherein the processor is further configured to: determine whether the service data can be transmitted by occupying a resource on the network side based on the first information.

13. The apparatus according to claim 9, wherein the processor is further configured to perform, based on the first information, at least one of:
(a) establishing a plurality of bearers or a plurality of flows for the service data;
(b) determining a scheduling priority of the service data;
(c) determining a transmission delay of the service data;
(d) determining a bit rate of the service data;
(e) establishing a transport layer proxy for the service data on a network side;
(f) selecting a service server for a service corresponding to the service data;
(g) determining a decoding manner of the service data;
(h) determining a type of a resource used for data transmission of the service data; and
(i) performing a local exchange for the service corresponding to the service data.

14. A service data transmission system, comprising:
an information control center; and
a service server, wherein
the information control center is configured to:
obtain first information from user equipment, wherein the first information comprises a type of an operating system;
the service server is configured to:
send second information to the information control center, wherein
the second information comprises: a service volume or routing information of a service flow or an application identifier of an application; and
the information control center is further configured to:
obtain the second information; and
control transmission of service data of the user equipment based on the first information and the second information.

15. The system according to claim 14, wherein the first information further comprises information of the user equipment including: a quantity of electricity, a screen resolution, a screen size, sensor information, or central processing unit usage.

16. The system according to claim 14, wherein the information control center is configured to: determine whether the service data can be transmitted by occupying a resource on the network side based on the first information and the second information.

17. The system according to claim 14, wherein the information control center is configured to:
perform, based on the first information and the second information, at least one of:
(a) establishing a plurality of bearers or a plurality of flows for the service data;
(b) determining a scheduling priority of the service data;
(c) determining a transmission delay of the service data;
(d) determining a bit rate of the service data;
(e) establishing a transport layer proxy for the service data on a network side;
(f) selecting a service server for a service corresponding to the service data;
(g) determining a decoding manner of the service data;
(h) determining a type of a resource used for data transmission of the service data; and
(i) performing a local exchange for the service corresponding to the service data.

18. The service data transmission apparatus according to claim 9, wherein
the second information includes a service volume or routing information of a service flow or the application identifier of the application.

19. A service data transmission method, the method comprising:
obtaining, by an information control center, first information from user equipment, wherein the first information comprises a type of an operating system;

sending, by a service server, second information to the information control center, wherein the second information comprises: a service volume, routing information of a service flow, or an application identifier of an application; and controlling, by the information control center, transmission of service data of the user equipment based on the first information and the second information.

20. The method according to claim 19, wherein controlling the transmission of the service data of the user equipment based on the first information and the second information comprises:

determining, by the information control center, whether the service data can be transmitted by occupying a resource on the network side based on the first information and the second information.

\* \* \* \* \*